United States Patent
Miller et al.

(10) Patent No.: US 6,461,576 B1
(45) Date of Patent: Oct. 8, 2002

(54) PYROPROCESS FOR PROCESSING SPENT NUCLEAR FUEL

(75) Inventors: William E. Miller, Naperville; Zygmunt Tomczuk, Lockport, both of IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/657,003

(22) Filed: Sep. 7, 2000

(51) Int. Cl.$^7$ .......................... C01G 56/00; C01F 17/00; C22B 60/00
(52) U.S. Cl. .......................... 423/5; 423/21.1
(58) Field of Search ............... 423/5, 21.1, DIG. 12; 976/DIG. 280; 376/310, 311

(56) References Cited

U.S. PATENT DOCUMENTS 3,981,960 A * 9/1976 Brambilla et al.
5,202,100 A * 4/1993 Nagel et al.

* cited by examiner

Primary Examiner—Steven Bos
(74) Attorney, Agent, or Firm—Mark P. Dvorscak; Bradley W. Smith; Virginia B. Caress

(57) ABSTRACT

This is a pyroprocess for processing spent nuclear fuel. The spent nuclear fuel is chopped into pieces and placed in a basket which is lowered in to a liquid salt solution. The salt is rich in $ZrF_4$ and containing alkali or alkaline earth fluorides, and in particular, the salt chosen was LiF-50 mol % $ZrF_4$ with a eutectic melting point of 500° C. Prior to lowering the basket, the salt is heated to a temperature of between 550° C. and 700° C. in order to obtain a molten solution. After dissolution the oxides of U, Th, rare earth and other like oxides, the salt bath solution is subject to hydrofluorination to remove the oxygen and then to a fluorination step to remove U as gaseous $UF_6$. In addition, after dissolution, the basket contains $PuO_2$ and undissolved parts of the fuel rods, and the basket and its contents are processed to remove the Pu.

16 Claims, 2 Drawing Sheets

PYROPROCESS FOR PROCESSING SPENT NUCLEAR FUEL

CONTRACTUAL ORIGIN OF THE INVENTION

The United States Government has rights in this invention pursuant to Contract No. W-31-109-ENG-38 between the U.S. Department of Energy and the University of Chicago.

FIELD OF THE INVENTION

This invention is a method for treating spent nuclear fuel through the use of pyroprocessing.

BACKGROUND OF THE INVENTION

There is an ongoing problem concerning the treatment of nuclear waste based on uranium oxide nuclear fuel. Currently, the oxide fuel is reduced chemically by lithium to a metal in a molten salt. This head-end reduction step, with the elimination of oxygen, precedes an electrometallurgical process. There are some difficulties in the application of the lithium head-end process when applied to chopped oxide fuel where massive pellets of oxide inside Zircaloy cladding must be attacked by the reductant. Among these are the inability of the lithium to penetrate the massive pellets in a reasonable time and consequently, the need to remove the cladding and reduce the size of the massive pellets. Another problem fuel is Thorium oxide, $ThO_2$, clad with zirconium. Lithium will not reduce this oxide.

Applicants have found that massive solids of $ThO_2$ and $UO_2$ will dissolve in a select reagent of LiF-50 mol % $ZrF_4$ (eutectic mp-500° C.). As a result, the cited reagent is effective in treating spent nuclear fuel of the form $UO_2$—$ThO_2$—$ZrO_2$ in a ceramic matrix and having a Zr cladding and other oxide residues containing Transuranic (TRU) Oxides.

Thus, the objective of this invention is to provide a reagent to chemically attack spent nuclear fuel in particular, but not limited to, fuel from light water reactors (LWR) or light water breeder reactors (LWBR).

Another objective is to combine the initial treatment of the spent nuclear fuel with plutonium recovery.

Additional advantages, objects and novel features of the invention will become apparent to those skilled in the art upon examination of the following and by practice of the invention.

SUMMARY OF THE INVENTION

To achieve the foregoing and other advantages, this invention is a method for treating spent nuclear fuel through the use of a pyroprocessing technique which is carried out in one vessel in a single molten salt bath. The chosen reagent is LiF-50 mol % $ZrF_4$ (eutectic mp 500° C.), but other $ZrF_4$ rich salt could be used. The reagent is heated to a temperature between 550–650° C. where is in a molten liquid state. The spent nuclear fuel is chopped into pieces and placed in a basket which is lowered into the molten salt. The products of the reaction between the salt and the spent nuclear fuel, in the form of $UO_2$ and $ThO_2$, are $UF_4$, $ThF_4$ and $ZrO_2$. All of the products of the reaction dissolve in the liquid salt and thus, are effectively separated from the solids which remain in the basket. These solids include $PuO_2$ and the noble fission product elements (Mo, Ru, Tc, Rh, Pd, etc). The liquid salt together with the dissolved constituents are subjected to hydrofluorination to convert the $ZrO_2$ to $H_2O$ gas which is separated from the salt, and $ZrF_4$ which remains with the salt bath. To recover the uranium product, the salt bath is then subject to fluorination yielding a gaseous $UF_6$ product. The residual salt bath is then either recycled or converted to a fluorapatite waste. The Pu remaining in the basket can be recovered using a Pu recovery process.

BRIEF DESCRIPTION OF THE DRAWINGS

The present invention is illustrated in the accompanying drawing where.

DETAILED DESCRIPTION OF THE INVENTION

Figure 1:
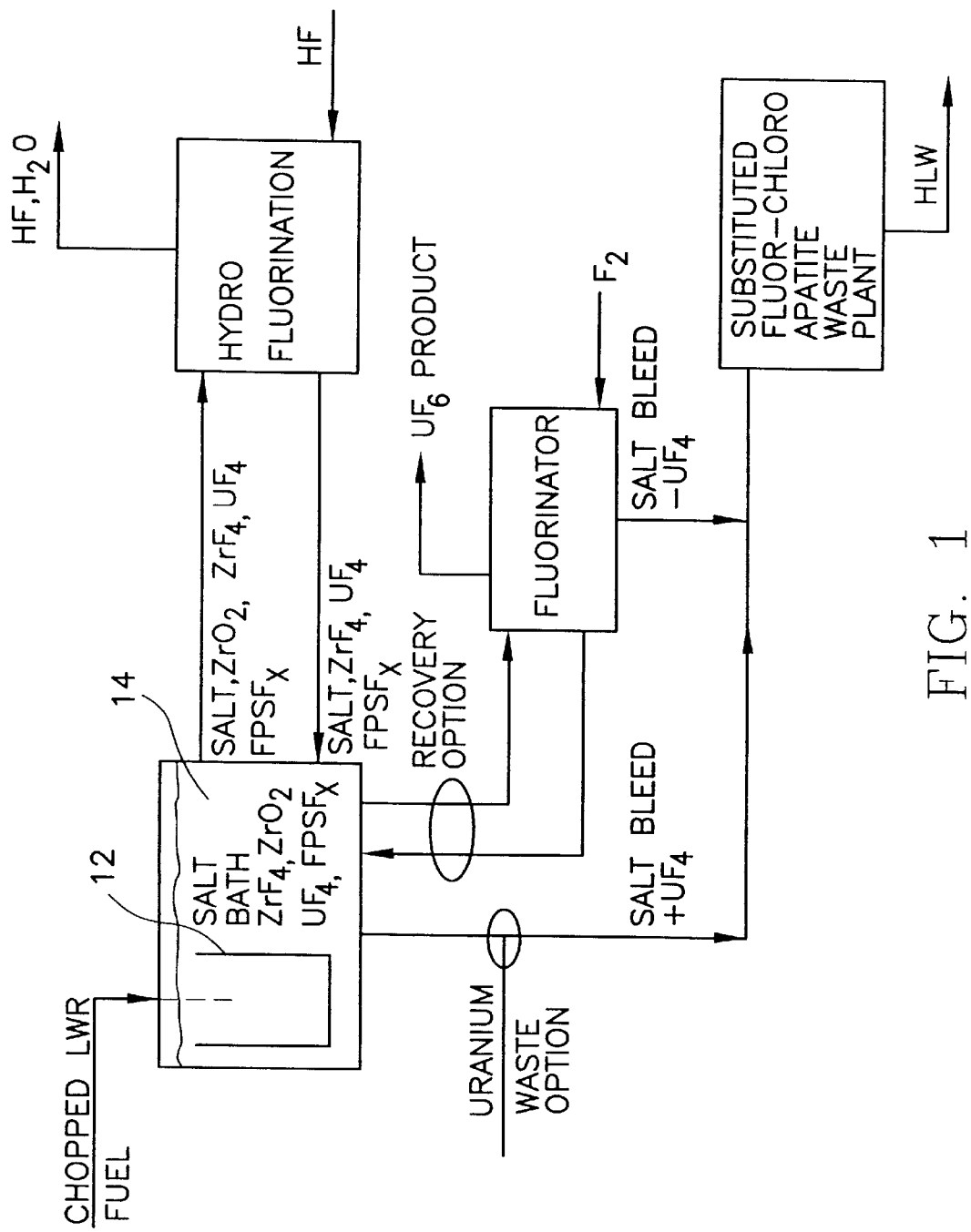
FIG. 1 illustrates the pyroprocess for the treatment of spent nuclear fuel.

FIG. 1 depicts a schematic of the process for treating spent nuclear fuel and in particular, spent light water reactor (LWR) fuel. The process involves the pyroprocessing of spent nuclear fuel using a molten salt bath. The key step in the process is the dissolution of such oxides as $UO_2$, $ThO_2$, CaO, SrO, $Cs_2O$, $La_2O_3$, MgO and other like oxides such as those of all the rare earth elements. Massive solids of these materials are readily dissolved in the LiF-50 mol % $ZrF_4$, at a temperature of approximately 600° C., generally 550° C.–700° C., which liquefies the salt. The choice of this reagent results in good dissolution of the massive oxide solids with the result that there is no need to electrorefine away the Zircalloy cladding usually encasing the spent nuclear fuel; in the alternative, other salt composition rich in $ZrF_4$ and containing alkali or alkaline earth fluoride can also be used. As a result of the good dissolution, the fuel pins are cut into short cladding segments and are placed into screen basket pouches, made from ferrous metal, within a screen basket agitator 12, FIG. 1 which is then lowered into the salt bath matrix 14 held in a container or dissolver having ferrous metal walls. The agitator, containing the chopped fuel, is rotated in the salt bath forcing the salt to flow through the screening making up the baskets outer walls. This dissolves the bulk of the oxide fuel according to the chemical reaction:

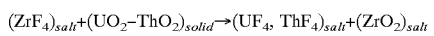

The products of the reaction $UF_{41}$, $ThF_4$ and $ZrO_2$ all dissolve in the liquid salt and are, thus, effectively separated from the solids remaining in the basket. There is a finite solubility of the $ZrO_2$ reaction product; however, the solubility is sufficient to dissolve all of the $ZrO_2$ produced in a reasonable quantity of bulk salt. The solubility of the oxide specie, $ZrO_2$, is greater than 0.25 mole/kg of salt. Without agitation, it was determined that the complete dissolution of massive $ThO_2$, and then $UO_2$ was less than 24 hours.

The cladding segments together with $PuO_2$ and the Noble Metal fission products (Mo, Ru, Tc, Rh, Pd, etc.) do not dissolve in the salt bath matrix 14; rather, they are removed from the solution along with the screen basket agitator 12 after the oxide dissolution of the initial charge of chopped fuel. The solids can be processed into the metal waste form and/or treated to remove TRU oxides. The active fission products (alkali, alkaline earth, and rare earths) are oxides in the fuel, but when these oxides and other matrix oxides are contacted with the salt $ZrF_4$, they will react to give $ZrO_2$ and the corresponding fluoride, such as:

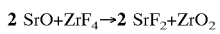

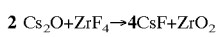

$2 La_2O_3 + 3 ZrF_4 \rightarrow 4 LaF_3 + 3 ZrO_2$ $2CaO + ZrF_4 \rightarrow 2 CaF_2 + ZrO_2$ The fluoride compounds are soluble in the matrix salt and become part of the dissolver solution. They do not participate further in chemical reactions.

After the dissolution is complete, the dissolver solution is circulated through a hydro-fluorinator. Here the solution is sparged with HF gas, in an inert dilutent, to convert the $ZrO_2$ into $H_2O$ and $ZrF_4$ The $H_2O_2$ is swept out with the sparge gas effulent, and the $ZrF_4$ dissolves in the salt to recycle this primary agent. This continues until the reaction is completed by the disappearance of $ZrO_2$ from the salt. This technique purges the system of oxygen from the matrix salt. The dissolved $UF_4$, $ThF_4$, $CaF_2$ and fission product fluorides are not affected by the HF. The sparge gas effluent is cooled to condense the steam and this removes the oxygen, as water, from the system.

The uranium is stripped completely from the salt by a fluorine gas sparge. This converts $UF_4$ to the vapor species $UF_6$. The other fluorides in the salt are not affected by the fluorination, so the vessel with its contained solution is ready to be recyled. Periodically, as required by the fission product content, the liquid salt matrix is taken from the cell and converted into substituted fluor apatite.

Figure 2:
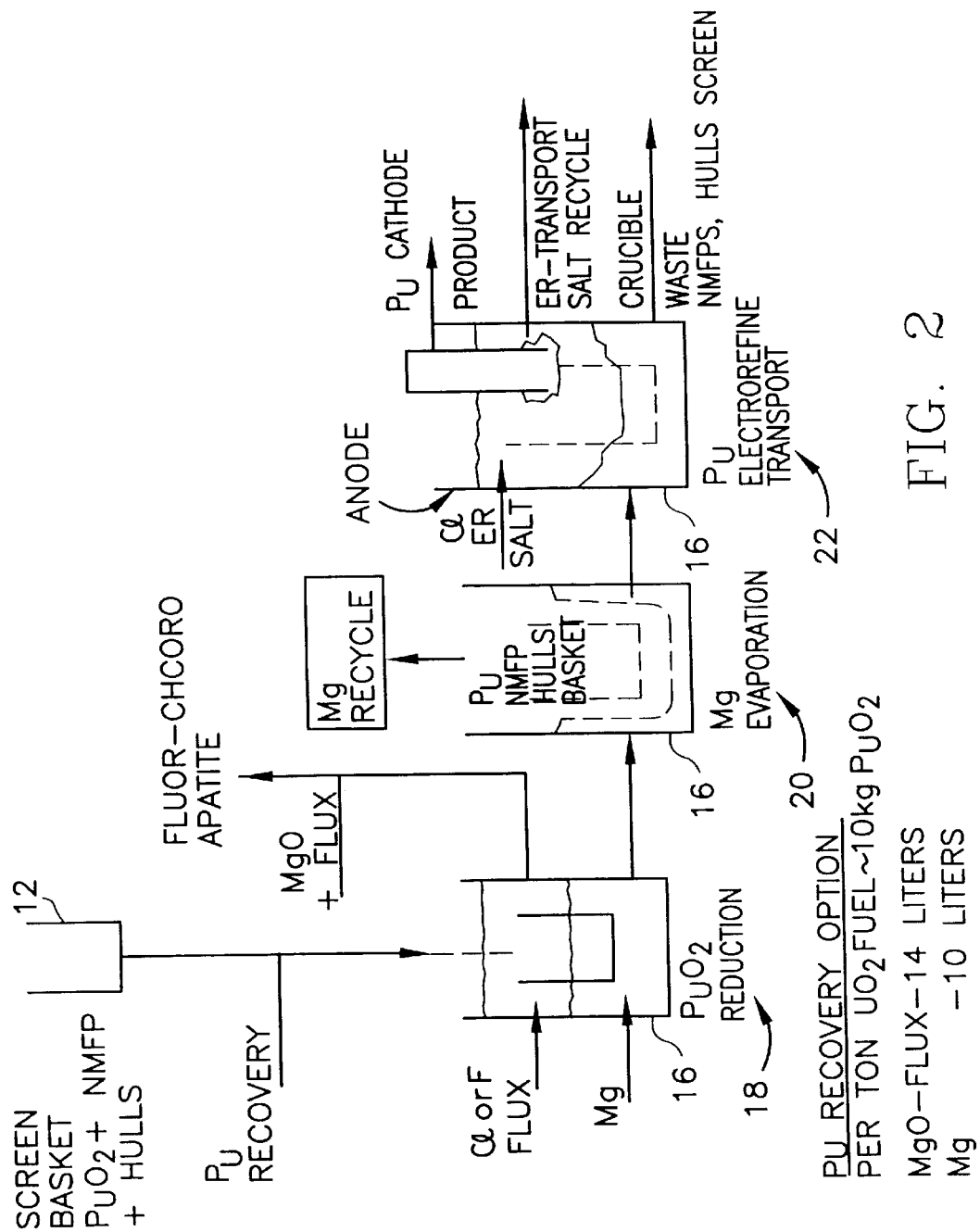
FIG. 2 illustrates the option used for the recovery of plutonium.

To recover the Pu, the screen basket 12, FIG. 2, is placed in either a chloride or fluoride salt flux which is in contact with molten Mg (mp 660°) and contained in the crucible 16. In this /step, 18, MgO is formed in the flux, and the combination is discarded as a process waste to make chloro or fluor apatite rocks. Initially in this reduction process, the salt flux is heavier than the molten Mg, but as the reduction proceeds, the metal phase contains up to 40 weight percent. Plutonium, dissolved in the molten Mg, which causes the density of the metal phase to exceed that of the flux which contains the MgO reduction product. This allows the phase separation of the immiscible flux phase from the crucible. The resulting crucible contents are some of the crucible material, ferrous metal or zircalloy, the plutonium metal, noble metal fission products, cladding hulls, zircalloy, and the basket-screen, zircalloy or iron. The crucible 16, in the Mg evaporation step, 20, is heated under a vacuum to evaporate the Mg which is then condensed and recovered for recycle. A chloride flux having some $PuCl_3$ is added to the crucible 16, in step 22, which is made the anode in a heated bath, temperature in the range of 500–600° C., and the Pu metal is electrotransported to a cathode which after the transport is complete contains all of the metallic plutonium in the cell. The cathode product is withdrawn from the cell and processed to recover the Pu metal. The electrorefining flux containing $PUCl_3$ is recycled to the next batch for further Pu removal. The crucible, the contained Noble Metal fission products and the zircalloy cladding hulls and the basket screen are processed into high level waste. The quantity of materials needed for the Pu recovery operation are: the flux volume needed to separate the MgO reduction product is about 14 liters per one metric ton of light water reactor (LWR) fuel. The Mg phase is about 10 liters per metric ton.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A process of treating spent nuclear fuel by means of pyroprocessing comprising:

dividing a spent nuclear fuel rod into small segments;

placing said segments in a basket;

heating a salt past its melting point, in a dissolver container, so as to form a molten salt bath where said salt is $ZrF_4$ rich and is selected so that said molten salt bath dissolves oxides of U, Th, and rare earth while leaving undissolved Pu oxide and noble metal fission products;

placing said basket into said molten salt bath for a sufficient period of time to allow for a dissolution of the oxides of U, Th, and rare earth to form a salt bath solution;

removing said basket after the dissolution is complete wherein said basket contains $PuO_2$ and undissolved parts of said fuel rod.

2. The process of claim 1 wherein said salt bath solution is subjected to hydrofluorination to remove oxygen from said solution and then recycled to said dissolver container.

3. The process of claim 1 wherein said salt bath solution is passed through a fluorination process to remove U as gaseous $UF_6$ and a salt bleed minus most $UF_4$ is either recycled back to said dissolver container or is processed to form fluorapatite.

4. The process of claim 1 wherein said basket and its contents are processed to remove Pu compounds present after the dissolution is complete.

5. The claim 1 wherein said salt also contains alkali or alkaline earth fluorides.

6. The process of claim 5 wherein the salt is LiF-50 mol % $ZrF_4$ with a eutectic melting point of approximately 500° C.

7. The process of claim 1 wherein said salt bath is heated to a temperature between 550° C. to 700° C.

8. The process of claim 1 wherein a salt bleed containing $UF_4$ is processed to form an fluorapatite.

9. A process of treating spent nuclear fuel by means of pyroprocessing comprising:

dividing a spent nuclear fuel rod into small segments;

placing said segments in a basket;

heating a salt past its melting point, in a dissolver container, so as to form a molten salt bath where said salt is LiF-50 Mol % $ZrF_4$ which dissolves oxides of U, Th, and rare earth while leaving undissolved Pu oxide and noble metal fission products;

placing said basket into said molten salt bath for a sufficient period of time to allow for a dissolution of the oxides of U, Th, and rare earth to form a salt bath solution;

removing said basket after the dissolution is complete wherein said basket contains $PuO_2$ and undissolved parts of said fuel rod.

10. The process of claim 9 wherein said salt bath solution is subjected to hydro-fluorination to remove oxygen from said solution and then recycled to said dissolver container.

11. The process of claim 9 wherein said salt bath solution is passed through a fluorination process to remove U as gaseous $UF_6$ and a salt bleed minus most $UF_4$ is either recycled back to said dissolver container or is processed to form fluorapatite.

12. The process of claim 9 wherein said basket and its contents are processed to remove Pu compounds present after the dissolution is complete.

13. The claim 9 wherein said salt also contains alkali or alkaline earth fluorides.

14. The process of claim 9 wherein the LiF-50 mol % $ZrF_4$ salt has a eutectic melting point of approximately 500° C.

15. The process of claim 9 wherein said salt bath is heated to a temperature between 550° C. to 700° C.

16. The process of claim 9 wherein a salt bleed containing $UF_4$ is processed to form an fluorapatite.

* * * * *